(12) United States Patent
Pu et al.

(10) Patent No.: US 12,345,849 B2
(45) Date of Patent: Jul. 1, 2025

(54) METHOD FOR DISTINGUISHING SUNNY-RAINY WEATHER BASED ON TIME DIVISION LONG-TERM EVOLUTION NETWORK

(71) Applicant: National University of Defense Technology, Changsha (CN)

(72) Inventors: Kang Pu, Changsha (CN); Xichuan Liu, Changsha (CN); Lei Liu, Changsha (CN)

(73) Assignee: National University of Defense Technology, Changsha (CN)

( * ) Notice: Subject to any disclaimer, the term of this patent is extended or adjusted under 35 U.S.C. 154(b) by 439 days.

(21) Appl. No.: 18/149,004

(22) Filed: Dec. 30, 2022

(65) Prior Publication Data

US 2023/0161071 A1  May 25, 2023

Related U.S. Application Data

(63) Continuation of application No. PCT/CN2021/136788, filed on Dec. 9, 2021.

(30) Foreign Application Priority Data

Oct. 12, 2021 (CN) .......................... 202111184976.5

(51) Int. Cl.
*H04L 41/16* (2022.01)
*G01W 1/06* (2006.01)
*H04W 24/08* (2009.01)

(52) U.S. Cl.
CPC .............. *G01W 1/06* (2013.01); *H04L 41/16* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 2022/0100731 A1* | 3/2022 | Tirapu Azpiroz | ..... G01N 33/02 |
| 2024/0168198 A1* | 5/2024 | Cook | ....................... G01W 1/10 |

FOREIGN PATENT DOCUMENTS

| | | |
|---|---|---|
| CN | 104656163 A | 5/2015 |
| CN | 109581546 A | 4/2019 |

(Continued)

OTHER PUBLICATIONS

Avanzato et al., Hydrogeological Risk Management in Smart Cities: A New Approach to Rainfall Classification Based on LTE Cell Selection Parameters, IEEE Access, vol. 8, 2020, pp. 137161-137173, dated Aug. 5, 2020.

(Continued)

*Primary Examiner* — Angela Nguyen
(74) *Attorney, Agent, or Firm* — Westbridge IP LLC

(57) ABSTRACT

Disclosed is a method for distinguishing sunny-rainy weather based on time division long-term evolution network, including the following steps: acquiring sunny-rainy feature by extracting communication measurement statistics of time division long-term evolution network base stations in a certain area; establishing a training set according to that observation result of multiple statistical periods, multiple base stations and multiple rain gauges in the region; establishing a sunny-rainy discrimination model combined with machine learning binary classification algorithm, so as to realize the identification of rainfall events covered by a single base station; calculating the reliability of rainfall events at specific locations based on the comprehensive judgment results of multiple base stations.

9 Claims, 7 Drawing Sheets

(56) References Cited

FOREIGN PATENT DOCUMENTS

| | | |
|---|---|---|
| CN | 110728411 A | 1/2020 |
| CN | 111401602 A | 7/2020 |
| CN | 111401644 A | 7/2020 |
| WO | 2017133636 A1 | 8/2017 |
| WO | WO-2024088450 A1 * 5/2024 .............. G01W 1/02 |

OTHER PUBLICATIONS

Beritelli et al., Rainfall Estimation Based on the Intensity of the Received Signal in a LTE/4G Mobile Terminal by using a Probabilistic Neural Network, IEEE Access, dated Jun. 26, 2018.

Second Office Action issued in counterpart Chinese Patent Application No. 202111184976.5, dated Jul. 27, 2022.

Teng et al., Identifying Local Rainfall Type and Forecasting Rainfall Quantity Based on Mixed Multiple PNN and RBF Neural Network Models, Journal of Chinese Computer System, vol. 37, No. 11, pp. 2571-2576, dated Nov. 30, 2016.

* cited by examiner

|  | Predict class | |
|---|---|---|
| Real class | Sunny | Rainy |
| Sunny | 91.6% | 8.4% |
| Rainy | 7.3% | 92.7% |

Average test accuracy: 92.1%

FIG. 3 selecting 116 normally working time division long-term evolution network base stations $BS1, BS2, ..., BS116$ in the area, and each base station records the information returned by the mobile terminal in the $s$-th statistical period (statistical period $T = 60$ (min)) ($s = 1, 2, ..., 48$) — S201 the $m$-th base station calculate the number of reference signal reception power intervals $n_{1,m,s}, n_{2,m,s}, ..., n_{48,m,s}$ (there are 48 intensity interval in total), the total sampling points $N_{m,s}$ of reference signal reception power and the average reference signal reception power $Ave_{m,s}$ according to the information returned by the mobile terminal — S202

FIG. 7

METHOD FOR DISTINGUISHING SUNNY-RAINY WEATHER BASED ON TIME DIVISION LONG-TERM EVOLUTION NETWORK

CROSS-REFERENCE TO RELATED APPLICATIONS

This application claims priority to Chinese Patent Application No. 202111184976.5, filed on Oct. 21, 2021, the contents of which are hereby incorporated by reference.

TECHNICAL FIELD

The application relates to the field of meteorological detection, and in particular to a method for distinguishing sunny-rainy weather based on time division long-term evolution network.

BACKGROUND

Precipitation plays an extremely important role in the process of water cycle and energy cycle on the earth. The effective detection of precipitation information is of great significance to the early warning of natural disasters, agricultural production and traffic safety. At present, the professional ground-based rain gauge can accurately record the rainfall, but the sparse distribution limits the application of the observation results in a large scale. Weather radar can monitor the regional distribution of rainfall in a wide range, but Z-R (radar reflectivity factor-rainfall intensity) relationship will be affected by the local raindrop size distribution. Rain satellite can obtain the information of rainfall distribution around the world, but its spatial-temporal resolution is low and it is easily disturbed by clouds, so its ability to detect near-surface light rain is limited.

In addition to the above-mentioned professional meteorological instruments, non-cooperative electromagnetic wave sources widely distributed around the world can also be used for the detection of rainfall information. The most typical example is the rainfall information monitoring method based on commercial communication microwave link, which has the characteristics of sampling objects near the ground, high spatial and temporal resolution, and reflects the average condition of the path. In this method, the rain-induced attenuation information on the link is extracted by the level value recorded by the receiver, and the average rainfall intensity of the path is inversed by combining the International Telecommunication Union Radiocommunication Sector (ITU-R) rain-induced attenuation model. The rainfall information monitoring method based on this principle has been widely studied and applied in the world. However, at present, a large number of microwave backhaul links have been replaced by underground optical fibers, and less and less data of commercial communication microwave links are available in China, which greatly limits the popularization and application of rainfall information monitoring methods based on commercial communication microwave links in China in the future.

In addition to microwave backhaul links, in fact, non-cooperative signal sources that are more widely distributed are electromagnetic wave propagation networks formed between communication base stations and communication terminals, such as TD-LTE (Time-Division Long Term Evolution) network commonly used in 4G mobile phone communication. The communication electromagnetic wave frequency between 4G base station and mobile phone terminal is less than 3 GHz, and the microwave attenuation effect of rainfall is very weak in this frequency range, so it is difficult to extract the rain-induced attenuation first and then obtain the rainfall information like the microwave backhaul links. However, the measurement report provided by each TD-LTE network base station contains the counting information of multi-interval strength, quality and time delay of the terminal signal, which will change regularly when rainfall occurs, so the counting information has the potential to be applied to the monitoring of rainfall information in theory.

SUMMARY

The objective of the present application is to provide a method for distinguishing sunny-rainy weather based on time division long-term evolution network, so as to solve the problems existing in the prior art.

To achieve the above objective, the present application provides the following solutions.

The application provides a method for distinguishing sunny-rainy weather based on time division long-term evolution network, which includes the following steps:

constructing a sunny-rainy discrimination model, and inputting a sunny-rainy feature and a sunny-rainy label matrix into the sunny-rainy discrimination model for training; and analyzing credibility of rainfall events in a coverage area of a base station based on the trained rain-sunny discrimination model.

Optionally, before constructing the sunny-rainy discrimination model, the method further includes:

selecting a plurality of normally working time division long-term evolution network base stations in a same area, and recording return information of communication terminals in each base station in a same statistical period;

calculating a number of return parameters in each value interval, a total number of returns and an average number of return parameters;

taking the number of the return parameters in each value interval, the total number of return parameters and the average number of return parameters as a communication measurement statistics;

carrying out the calculation above in a plurality of statistical periods, and summarizing a plurality of the communication measurement statistics as the sunny-rainy feature; and constructing the sunny-rainy label matrix.

Optionally, the process of constructing the sunny-rainy label includes:

for a plurality of rain gauges in the same area, and judging whether there is a rainfall in the same statistical period based on an observation result of a rain gauge closest to a normally working time division long-term evolution network base station; and taking a judgment result as the sunny-rainy label, making and recording the above judgment in a plurality of statistical periods, and summarizing a plurality of the sunny-rainy labels obtained as the sunny-rainy label matrix.

Optionally, the sunny-rainy labels are determined by taking an accumulated rainfall recorded by the closest rain gauge in space and a threshold value of 0.1 mm as a dividing standard.

Optionally, the process of constructing the sunny-rainy discrimination model includes:

constructing the sunny-rainy discrimination model based on machine learning binary classification, wherein the machine learning binary classification includes a bagged decision tree classification algorithm.

Optionally, the process of inputting the obtained sunny-rainy feature and sunny-rainy label matrix into the sunny-rainy discrimination model for training includes:

taking the observation results of multi-statistical periods, multi-base stations and multi-rain gauges in the area in the sunny-rainy feature as a training set, and inputting into the sunny-rainy discrimination model; and conducting the training by identifying whether there is a rainfall event in the statistical period within the coverage area of the base station.

Optionally, the process of conducting the training by identifying whether there is a rainfall event in the statistical period within the coverage area of the base station includes:

comprehensively judging the probability of rainfall events in a certain position in the area based on the results of sunny-rainy discrimination of all communicable base stations in the position.

Optionally, the process of inputting the obtained sunny-rainy feature and sunny-rainy label matrix into the sunny-rainy discrimination model for training further includes:

testing the accuracy of the sunny-rainy discrimination model by ten-fold cross verification, and obtaining model performance indicators and a confusion matrix.

Optionally, the process of analyzing the credibility of rainfall events in the coverage area of the base station based on the trained sunny-rainy discrimination model includes: calculating a credibility of the rainfall based on an inverse distance weighting method.

The application discloses the following technical effects:

The application provides a method for distinguishing sunny-rainy weather based on time division long-term evolution network, which fully digs sensitive feature quantities of sunny-rainy periods on the basis of statistical results of time division long-term evolution network measurement reports, and realizes effective detection of rainfall information in a regional range; meanwhile, based on the widely existing time division long-term evolution network, the application provides a near-surface rainfall information monitoring means with ultra-low cost, wide coverage and high spatial resolution, and additional hardware cost investment is not needed, which has extremely high practical application prospect. The application may be used as a new method for identifying sunny-rainy period and applied to practical business.

BRIEF DESCRIPTION OF THE DRAWINGS

In order to more clearly explain the embodiments of the present application or the technical solutions in the prior art, the following will briefly introduce the drawings that need to be used in the embodiments. Obviously, the drawings in the following description are only some embodiments of the present application. For those of ordinary skill in the art, other drawings can be obtained according to these drawings without any creative effort.

FIG. 3 is a confusion matrix of a single base station sunny-rainy discrimination model in the embodiment of the present application.

FIG. 7 describes the steps of establishing label matrix based on the observation results of rain gauge in the area.

DETAILED DESCRIPTION OF THE EMBODIMENTS

The technical solutions in the embodiments of the present application will be clearly and completely described below with reference to the drawings in the embodiments of the present application. Obviously, the described embodiments are only part of the embodiments of the present application, but not all of them. Based on the embodiment of the present application, all other embodiments obtained by ordinary technicians in the field without creative labor are within the scope of the present application.

Figure 1:
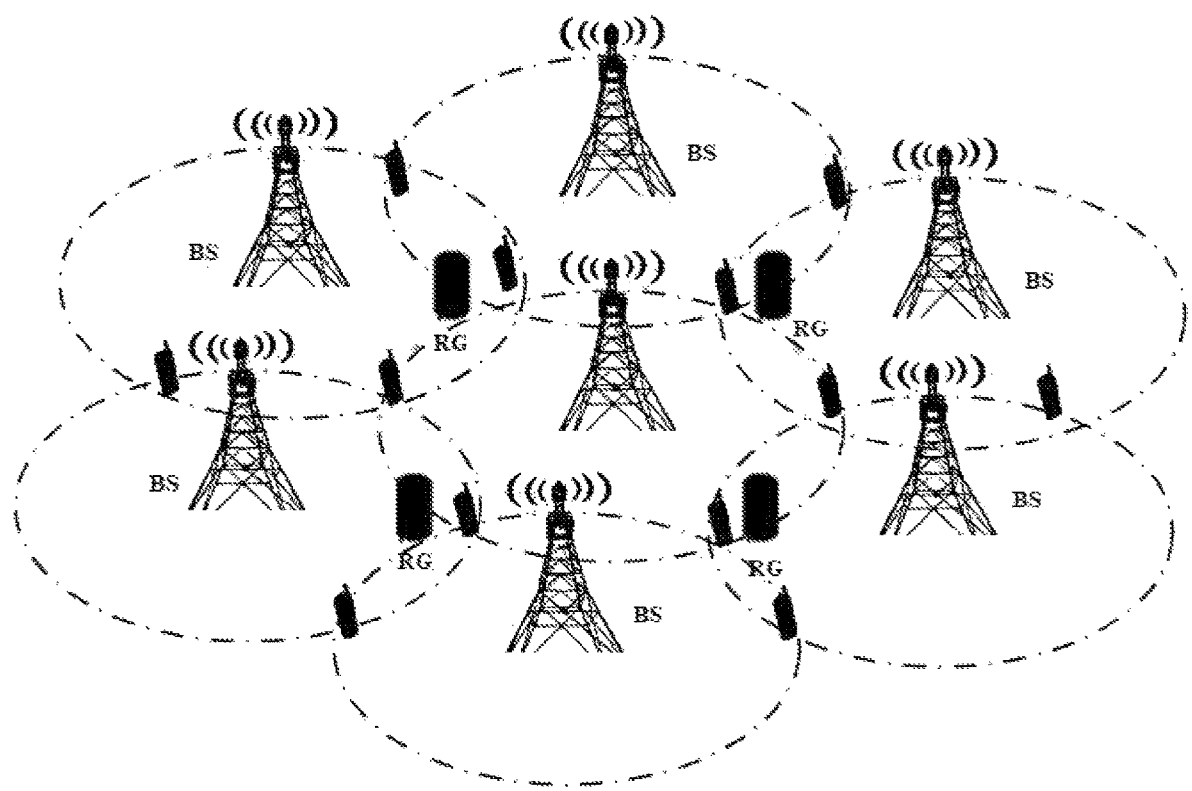
FIG. 1 is a schematic diagram of the distribution of communication base stations, communication terminals and rain gauges in the embodiment of the present application, wherein BS represents communication base stations, RG represents rain gauges, and mobile phone icons represent communication terminals.
Figure 2:
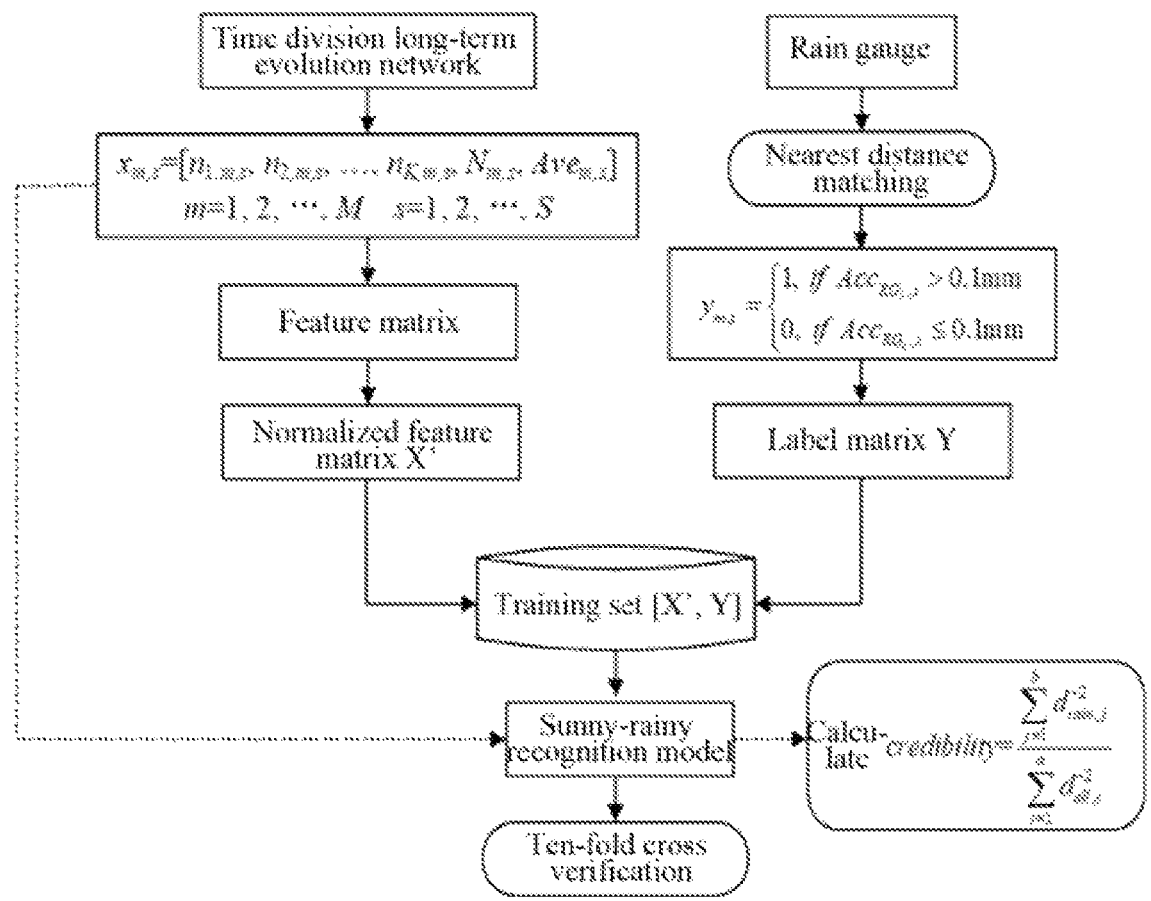
FIG. 2 is a working flow chart of a method for distinguishing sunny-rainy weather based on time division long-term evolution network in the embodiment of the present application, wherein the solid line represents the establishment process of a sunny-rainy discrimination model, and the dotted line represents the application process of the sunny-rainy discrimination model.
Figure 4:
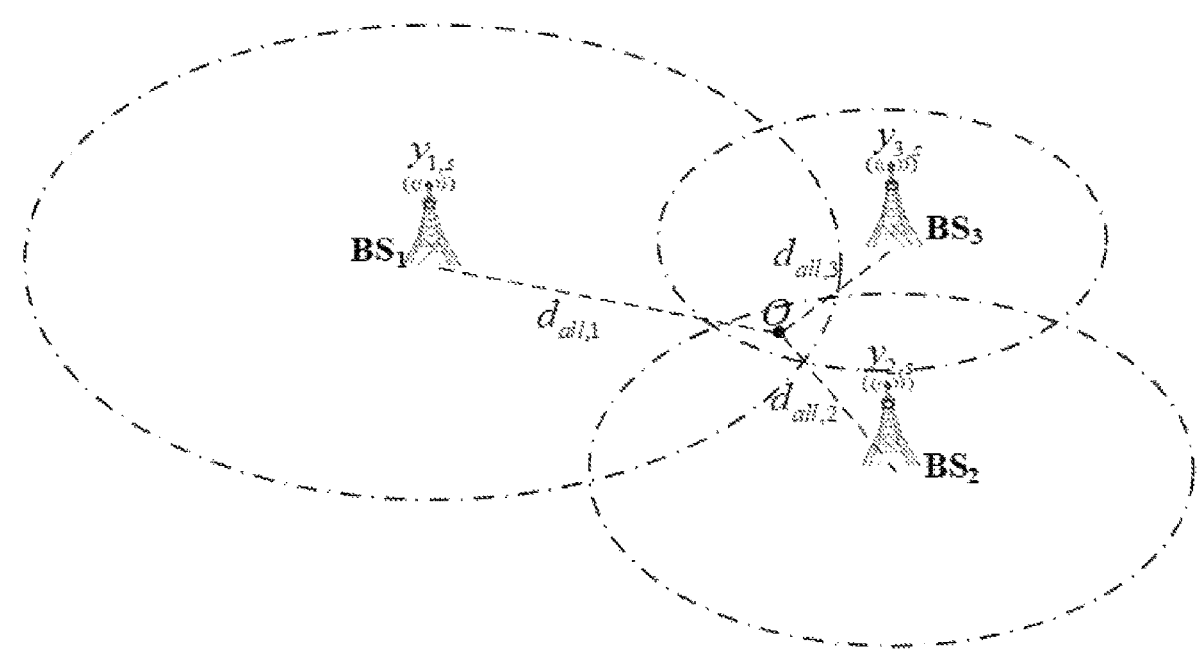
FIG. 4 is the calculation result of rainfall credibility at a certain position in the embodiment of the present application.

FIG. 1 is a schematic diagram of the distribution of communication base stations, communication terminals and rain gauges in the embodiment of the present application; FIG. 2 is a working flow chart of a method for distinguishing sunny-rainy weather based on time division long-term evolution network in the embodiment of the present application; FIG. 3 is a confusion matrix of a single base station sunny-rainy discrimination model in the embodiment of the present application; FIG. 4 is the calculation result of rainfall credibility at a certain position in the embodiment of the present application.

Figure 5:
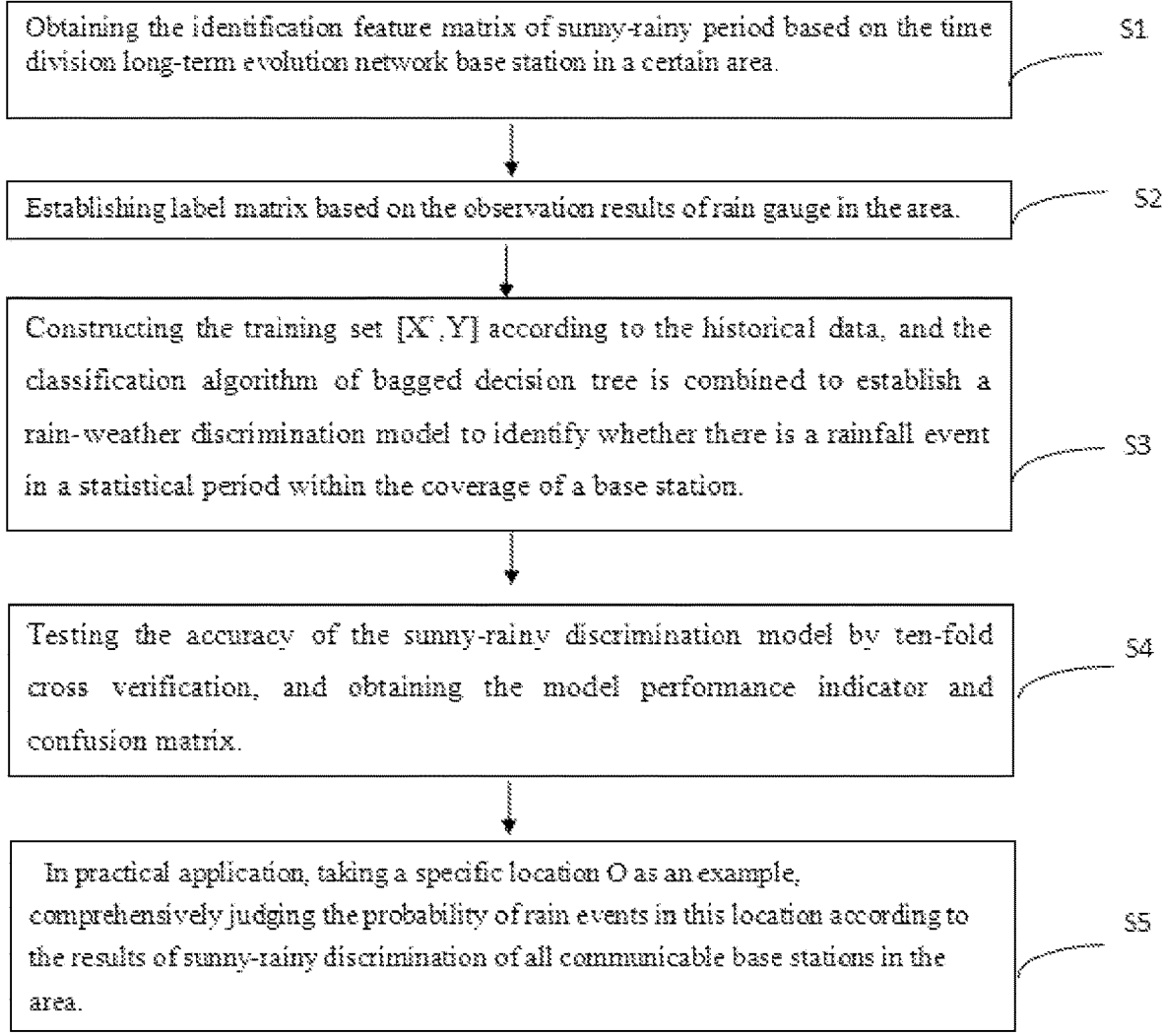
FIG. 5 describes the steps in the embodiment of the present invention, in which the communication measurement statistics of time division long-term evolution network base stations in a certain area are used to obtain the sunny-rainy feature, and a machine learning binary classification algorithm is combined to establish a sunny-rainy discrimination model to realize the identification of rainfall events covered by a single base station, and the credibility of rainfall events occurring at specific positions is comprehensively judged based on multiple base stations.
Figure 6:
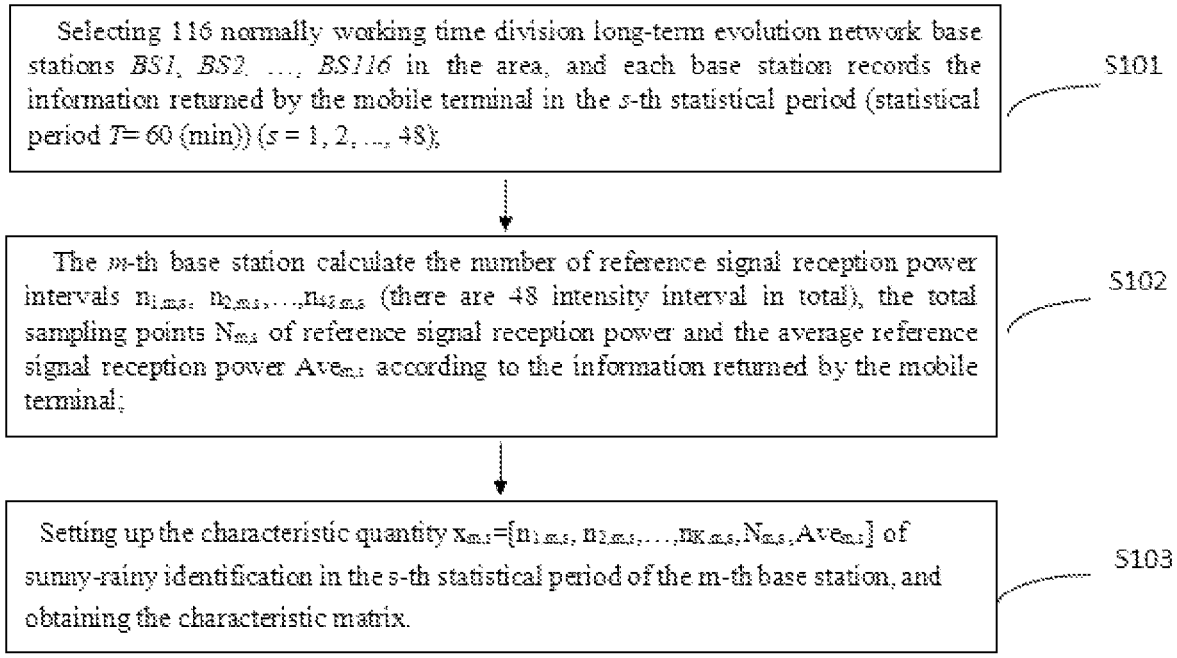
FIG. 6 describes the steps of obtaining the identification feature matrix of sunny-rainy weather based on the time division long-term evolution network base station in a certain area.

According to the application, the communication measurement statistics of time division long-term evolution network base stations in a certain area are used to obtain the sunny-rainy feature, and a machine learning binary classification algorithm is combined to establish a sunny-rainy discrimination model to realize the identification of rainfall events covered by a single base station, and the credibility of rainfall events occurring at specific positions is comprehensively judged based on multiple base stations, which mainly includes the following steps (as shown in FIGS. 5-7).

S1, obtaining the identification feature matrix of sunny-rainy weather based on the time division long-term evolution network base station in a certain area.

S101, selecting 116 normally working time division long-term evolution network base stations BS1, BS2, BS116 in the area, and each base station records the information returned by the mobile terminal in the s-th statistical period (statistical period T=60 (min)) (s=1, 2, . . . , 48);

S102, the m-th base station calculate the number of reference signal receiving power intervals $n_{1,m,s}$, $n_{2,m,s}$, ..., $n_{48,m,s}$ (there are 48 intensity interval in total), the total sampling points $N_{m,s}$ of reference signal receiving power and the average reference signal receiving power $Ave_{m,s}$ according to the information returned by the mobile terminal;

S103, setting up the feature $x_{m,s}=[n_{1,m,s}, n_{2,m,s}, \ldots, n_{K,m,s}, N_{m,s}, Ave_{m,s}]$ of sunny-rainy identification in the s-th statistical period of the m-th base station, and obtaining the feature matrix:

$$X = \begin{bmatrix} X_1 \\ X_2 \\ \ldots \\ X_{116} \end{bmatrix} \left( X_m = \begin{bmatrix} x_{m,1} \\ x_{m,2} \\ \ldots \\ x_{m,48} \end{bmatrix}, m = 1, \ldots, 116 \right),$$

and normalizing X to obtain X';

S2, establishing label matrix based on the observation results of rain gauge in the area.

S201, There is a rain gauge $RG_1$ in the area, and judging whether there is a rainfall in the s-th statistical period of the m-th base station according to the observation result of $RG_1$, and using the judgment result as the sunny-rainy label $y_{m,s}$:

$$y_{m,s} = \begin{cases} 1, & \text{if } Acc_{RG_1,s} > 0.2 \text{ mm} \\ 0, & \text{if } Acc_{RG_1,s} \leq 0.1 \text{ mm} \end{cases},$$

wherein $Acc_{RG_1,s}$ is the accumulated rainfall (mm) recorded by $RG_1$ in the s-th statistical period.

S202, Combining the sunny-rainy labels to obtain a label matrix:

$$Y = \begin{bmatrix} Y_1 \\ Y_2 \\ \ldots \\ Y_{116} \end{bmatrix} \left( Y_m = \begin{bmatrix} y_{m,1} \\ y_{m,2} \\ \ldots \\ y_{m,S} \end{bmatrix}, m = 1, \ldots, 116 \right).$$

S3, Constructing the training set [X', Y] according to the historical data, and the classification algorithm of bagged decision tree is combined to establish a sunny-rainy discrimination model to identify whether there is a rainfall event in a statistical period within the coverage of a base station.

S4, Testing the accuracy of the sunny-rainy discrimination model by ten-fold cross verification, and obtaining the model performance indicator and confusion matrix.

S5, in practical application, taking a specific location O as an example, comprehensively judging the probability of rainfall events in this location according to the results of sunny-rainy discrimination of all communicable base stations in the area. The number of all communicable base stations in location O is a=3, and the number of communicable base stations judged as rainy period in a certain statistical period is b. Calculate the credibility of rainfall events in this location in this statistical period according to the inverse distance weighting:

$$\text{credibility} = \frac{\sum_{j=1}^{b} d_{rain,j}^{-2}}{\sum_{i=1}^{3} d_{all,i}^{-2}},$$

where $d_{rain,j}$ (km) is the distance between the j-th communicable base station judged to be in the rainy period and this location, and $d_{all,i}$ (km) is the distance between the i-th communicable base station and this location. The calculation results are shown in FIG. 4 and Table 1.

TABLE 1

| $d_{all,1}$ | $d_{all,2}$ | $d_{all,3}$ | $y_{1,s}$ | $y_{2,s}$ | $y_{3,s}$ | $d_{rain,1}$ | $d_{rain,2}$ | $d_{rain,3}$ | credibility |
|---|---|---|---|---|---|---|---|---|---|
| 2 km | 1.5 km | 1 km | 1 | 1 | 1 | $d_{all,1}$ | $d_{all,2}$ | $d_{all,3}$ | 1.00 |
| | | | 1 | 1 | 0 | $d_{all,1}$ | $d_{all,2}$ | — | 0.41 |
| | | | 1 | 0 | 1 | $d_{all,1}$ | $d_{all,3}$ | — | 0.74 |
| | | | 1 | 0 | 0 | $d_{all,1}$ | — | — | 0.15 |
| | | | 0 | 1 | 1 | $d_{all,2}$ | $d_{all,3}$ | — | 0.85 |
| | | | 0 | 1 | 0 | $d_{all,2}$ | — | — | 0.26 |
| | | | 0 | 0 | 1 | $d_{all,3}$ | — | — | 0.41 |
| | | | 0 | 0 | 0 | — | — | — | 0.00 |

In the practical application process, according to the feature extracted from the time division long-term evolution network measurement report, the sunny-rainy label of single base station coverage and the comprehensive judgment result of rainfall credibility of multi-base station intersection area can be directly obtained.

The above shows and describes the basic principle, main features and advantages of the present application. It should be understood by those skilled in the art that the application is not limited by the above-mentioned embodiments. The above-mentioned embodiments and descriptions only illustrate the principles of the application. Without departing from the spirit and scope of the application, there will be various changes and improvements of the application, all of which fall within the scope of the claimed application. The scope of that application is defined by the appended claim and their equivalents.

What is claimed is:

1. A method for distinguishing sunny-rainy weather based on a time division long-term evolution network, comprising:
   constructing a sunny-rainy discrimination model, and inputting a sunny-rainy feature and a sunny-rainy label matrix into the sunny-rainy discrimination model for training; and
   analyzing credibility of rainfall events in a coverage area of a base station based on the trained rain-sunny discrimination model.

2. The method according to claim 1, wherein, before constructing the sunny-rainy discrimination model, the method further comprises:
   selecting a plurality of normally working time division long-term evolution network base stations in a same area, and recording return information of communication terminals in each base station in a same statistical period;
   calculating a number of return parameters in each value interval, a total number of returns and an average number of return parameters;
   taking the number of the return parameters in each value interval, the total number of return parameters and the average number of return parameters as a communication measurement statistics;
   carrying out the calculation above in a plurality of statistical periods, and summarizing a plurality of the communication measurement statistics as the sunny-rainy feature; and
   constructing the sunny-rainy label matrix.

3. The method according to claim 2, wherein the process of constructing the sunny-rainy label comprises:
   for a plurality of rain gauges in the same area, judging whether there is a rainfall in the same statistical period based on an observation result of a rain gauge closest to a normally working time division long-term evolution network base station; and
   taking a judgment result as the sunny-rainy label, making and recording the above judgment in a plurality of statistical periods, and summarizing a plurality of the sunny-rainy labels obtained as the sunny-rainy label matrix.

4. The method according to claim 3, wherein the sunny-rainy labels are determined by taking an accumulated rainfall recorded by the closest rain gauge in space and a threshold value of 0.1 mm as a dividing standard.

5. The method according to claim 1, wherein the process of constructing the sunny-rainy discrimination model comprises:
   constructing the sunny-rainy discrimination model based on machine learning binary classification, wherein the machine learning binary classification comprises a bagged decision tree classification algorithm.

6. The method according to claim 2, wherein the process of inputting the obtained sunny-rainy feature and sunny-rainy label matrix into the sunny-rainy discrimination model for training comprises:
   taking the observation results of multi-statistical periods, multi-base stations and multi-rain gauges in the area in the sunny-rainy feature as a training set, and inputting into the sunny-rainy discrimination model; and
   conducting the training by identifying whether there is a rainfall event in the statistical period within the coverage area of the base station.

7. The method according to claim 6, wherein the process of conducting the training by identifying whether there is a rainfall event in the statistical period within the coverage area of the base station comprises:
   comprehensively judging the probability of rainfall events in a certain position in the area based on the results of sunny-rainy discrimination of all communicable base stations in the position.

8. The method according to claim 1, wherein the process of inputting the obtained sunny-rainy feature and sunny-rainy label matrix into the sunny-rainy discrimination model for training further comprises:
   testing the accuracy of the sunny-rainy discrimination model by ten-fold cross verification, and obtaining model performance indicators and a confusion matrix.

9. The method according to claim 1, wherein the process of analyzing the credibility of rainfall events in the coverage area of the base station based on the trained sunny-rainy discrimination model comprises: calculating a credibility of the rainfall based on an inverse distance weighting method.

* * * * *